United States Patent
Ogane et al.

(10) Patent No.: US 6,291,902 B1
(45) Date of Patent: Sep. 18, 2001

(54) ENGINE START CONTROL SYSTEM

(75) Inventors: Hiroaki Ogane; Masaaki Uchida, both of Kanagawa; Yuki Nakajima, Yokohama; Takahiro Yoshino, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/484,442

(22) Filed: Jan. 18, 2000

(30) Foreign Application Priority Data

Jan. 18, 1999 (JP) .................................................. 11-009366

(51) Int. Cl.$^7$ ....................................................... F02N 11/04
(52) U.S. Cl. ........................... 290/34; 123/179.1; 310/113
(58) Field of Search ................................. 290/34, 17, 31, 290/36 R, 38 R, 40 A, 40 B, 40 C, 10, 22, 46; 310/113; 123/179.1, 179.3

(56) References Cited

U.S. PATENT DOCUMENTS

| | | | |
|---|---|---|---|
| 4,942,493 | * 7/1990 | Rozman et al. | 361/23 |
| 4,948,997 | * 8/1990 | Ohmitsu et al. | 310/113 |
| 5,428,275 | * 6/1995 | Carr et al. | 318/146 |
| 5,430,362 | * 7/1995 | Carr et al. | 318/779 |
| 5,495,127 | * 2/1996 | Aota et al. | 290/31 |
| 5,497,741 | * 3/1996 | Tashiro et al. | 123/192.1 |
| 5,818,116 | * 10/1998 | Nakae et al. | 290/38 R |
| 6,018,198 | * 1/2000 | Tsuzuki et al. | 290/17 |
| 6,035,626 | * 3/2000 | Wahl et al. | 60/39.02 |
| 6,054,776 | * 4/2000 | Sumi | 290/17 |
| 6,098,584 | * 8/2000 | Ahner et al. | 123/179.3 |

FOREIGN PATENT DOCUMENTS 7-119594   5/1995   (JP) .

\* cited by examiner

Primary Examiner—Joseph Waks
(74) Attorney, Agent, or Firm—Foley & Lardner

(57) ABSTRACT

An engine start control apparatus includes a motor/generator and a controller for controlling the motor/generator. The controller starts an engine cranking operation to start the engine by operating the motor/generator in a cranking mode for driving an engine in response to an engine start command signal, monitors an operating condition of the engine cranking operation to produce a mode change signal before an engine speed exceeds a target speed, and switches the motor/generator from the cranking mode to an overshoot control mode to control the power generation of the motor/generator in accordance with a predetermined target parameter such as a target power generation torque and a desired engine speed.

18 Claims, 10 Drawing Sheets

ENGINE START CONTROL SYSTEM

BACKGROUND OF THE INVENTION

The present invention relates to an engine control system for controlling a start of an engine.

Instead of an ordinary dc starting motor, some starting systems employ an ac motor/generator having a function of power generation in addition to a function of motor. In an example shown in Japanese Patent Kokai Publication No. H7-119594, a motor/generator is directly connected with a crankshaft of an engine.

SUMMARY OF THE INVENTION

It is an object of the present invention to provide apparatus and method for controlling a start of an engine so as to effectively restrain an overshoot in the engine speed.

It is another object of the present invention to provide apparatus and method capable of preventing an overshoot with an adequate timing for starting power generation of a motor/generator and with an adequate power generating quantity for effectively preventing overshoot.

According to the present invention, an engine control system comprises: an engine for a vehicle; a motor/generator having a drive mode for driving the engine to start the engine and a power generation mode for converting mechanical energy from the engine into electric energy; a first input device for producing a vehicle start command signal; a second input device for determining an engine revolution speed of the engine; and a controller for starting an engine cranking operation to start the engine by operating the motor/generator in the drive mode in response to the start command signal, for measuring a time from a start of the engine cranking operation until the engine speed reaches a predetermined engine speed value, for calculating an electric power generation quantity in accordance with the time, and for controlling the power generation of the motor/generator in accordance with the power generation quantity after the arrival of the engine speed at the predetermined engine speed value.

According to another aspect of the present invention, an engine control system comprises a controller for starting an engine cranking operation to start the engine by operating the motor/generator in the drive mode in response to the start command signal, for producing a speed condition signal when the engine speed reaches a predetermined engine speed value, and for responding to the speed condition signal by terminating the engine cranking operation and instead starting a gradual speed increasing operation to control the motor/generator so as to increase the engine speed gradually to a desired target speed.

According to still another aspect of the present invention, an engine control system comprises a controller for starting an engine cranking operation to start the engine by operating the motor/generator in the drive mode in response to the start command signal, for producing a condition signal when a duration of the engine cranking operation reaches a predetermined length, and for responding to the condition signal by terminating the engine cranking operation and instead starting a power generating operation to control the motor/generator in the power generation mode in accordance with a predetermined power generation quantity.

According to still another aspect of the present invention, an engine control apparatus for controlling a motor/generator to start an engine for a vehicle may comprise: means for responding to an engine start command signal by starting an engine cranking operation to start the engine by operating the motor/generator in a cranking mode for driving the engine; means for monitoring an operating condition of the engine cranking operation to produce a mode change signal before an engine speed exceeds a target speed; and means for responding to the mode change signal by changing over an operating mode of the motor/generator from the cranking mode to an overshoot control mode to control the motor/generator to generate electric power in such a manner that an operating parameter of the motor/generator becomes equal to a predetermined desired value.

An engine start control process according to the present invention may comprise: producing an engine start command signal; starting an engine cranking operation to start the engine by operating an motor/generator in a cranking mode for driving an engine in response to the engine start command signal; monitoring an operating condition of the engine cranking operation to produce a mode change signal before an engine speed exceeds a target speed; and responding to the mode change signal by changing over an operating mode of the motor/generator from the cranking mode to an overshoot control mode to control power generation of the motor/generator in accordance with a predetermined target parameter which is one of a desired power generation torque and a desired engine speed.

DETAILED DESCRIPTION OF THE INVENTION

Figure 1:
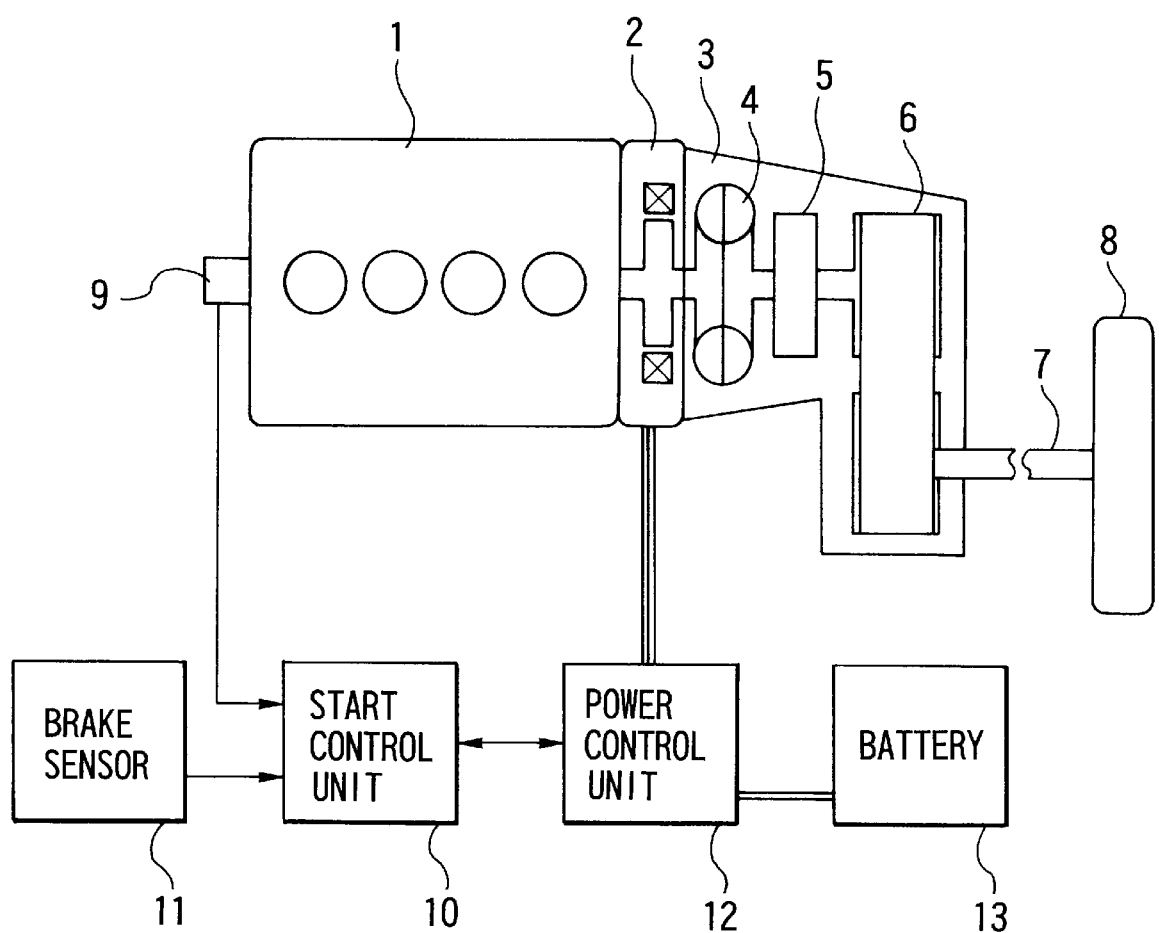
FIG. 1 is a schematic view showing an engine control system according to a first embodiment of the present invention.

FIG. 1 schematically shows a vehicle equipped with an engine control system (or an engine start control system) employed in illustrated embodiments of the present invention. The engine control system is a combination of a controlling system and a controlled system.

As shown in FIG. 1, a motor/generator 2 is connected between an engine 1 and a transmission 3. The motor/generator 2 is a machine combining a function of electric motor and a function of electric generator.

The motor/generator 2 of this example is directly connected with a crankshaft of the engine 1, so that the motor/generator 2 rotates synchronously with the engine 1. The transmission 3 of this example is a continuously variable automatic transmission (CVT) including a torque converter 4, a forward-reverse clutch 5 and a belt type continuously variable transmission 6. The driving torque of the engine 1 is transmitted through the transmission 3 to a drive shaft 7 and a drive wheel 8 of the vehicle.

In place of the direct driving connection between the engine 1 and the motor/generator 2, it is possible to employ a belt drive or a chain drive between the crankshaft of the engine 1 and the motor/generator 2. The transmission 3 may be a multi-speed transmission such as an automatic transmission having an automatic shifting planetary gear train, instead of the CVT transmission.

An electric power control unit 12 switches an operating mode of the motor/generator 2 between a driving mode (or motor mode) and a driven mode (generator mode). Moreover, the power control unit 12 controls the supply of electric power from a battery 13 to the motor/generator 2 in the driving mode, and further controls the power generation of the motor/generator 2 and the charge of the battery 13 in the driven mode.

A revolution sensor 9 is a sensor for sensing a revolution speed of at least one of the engine 1 and the motor/generator 2. In this example, the revolution sensor 9 is in the form of a crank angle sensor. A sensor signal from the revolution sensor 9 is supplied to a start control unit 10.

A brake sensor 11 senses a depression degree of a brake pedal of the vehicle. A sensor signal from the brake sensor 11 is supplied to the start control unit 10.

In accordance with the sensor signals from the revolution sensor 9 and the brake sensor 11, the start control unit 10 delivers, to the power control unit 12, target torque and target revolution speed for the motor/generator 2, and thereby controls the start of the engine 1 by controlling the motor/generator 2 through the power control unit 12.

The start control unit 10 of this example is provided in an engine control unit. However, it is optional to provide the start control unit 10 in an integrated controller for controlling the entirety of the vehicle power train.

Figure 2:
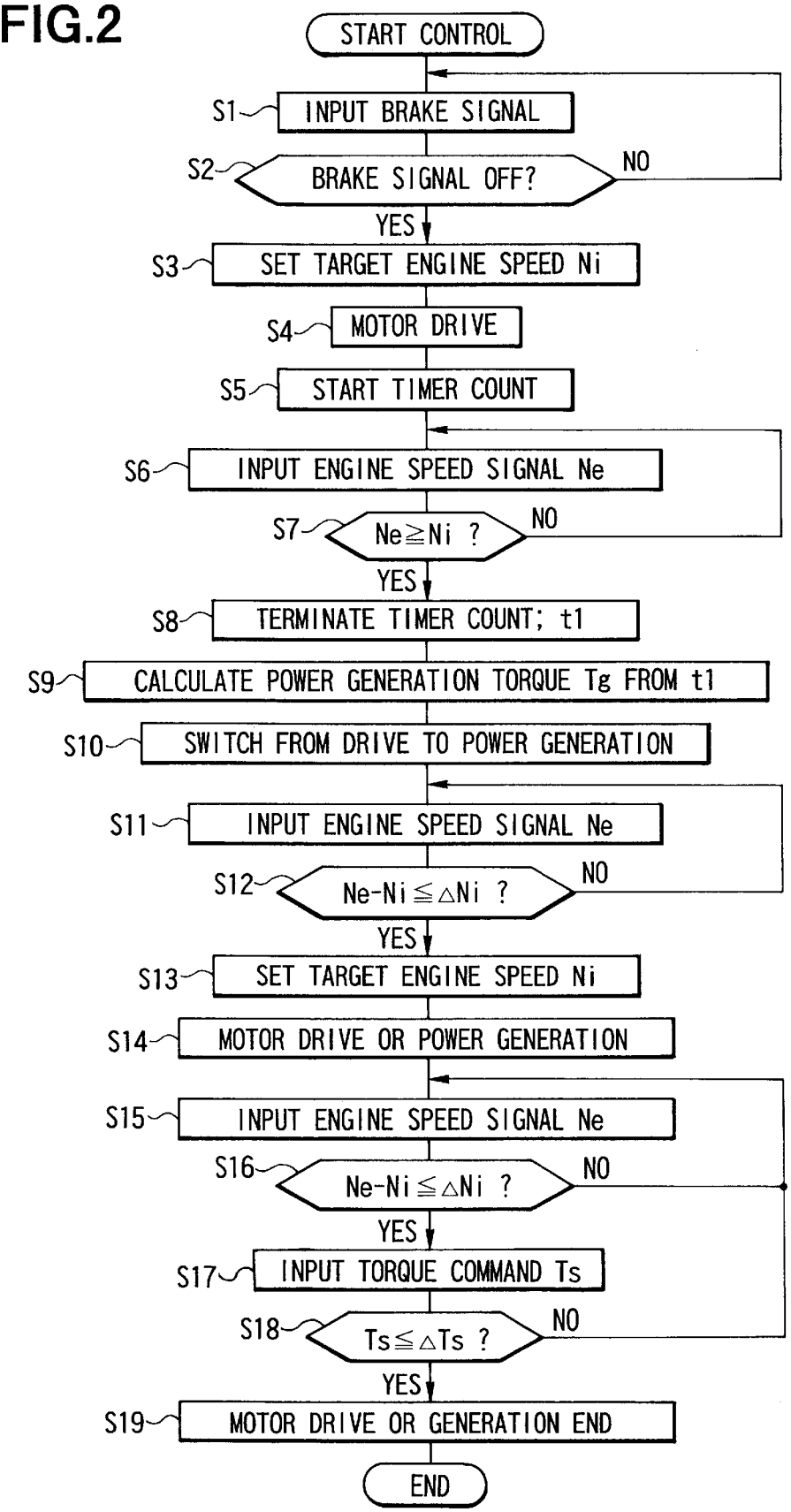
FIG. 2 is a flowchart showing a control process according to the first embodiment.

This start control system can be used as a main component of an automatic engine stop-restart system. When the vehicle is brought to a stop after an engine warm-up operation, the engine control system stops the engine temporarily by shutting off the fuel injection after the elapse of a predetermined amount of time if the brake pedal is depressed by the driver, the vehicle speed is approximately equal to zero km/h, and the engine speed is equal to an idle speed. Thereafter, when the driver releases the brake pedal (with the select lever being in a drive range etc.), the engine control system restarts the engine according to the start control process of this embodiment as shown in FIG. 2. In this example, the fuel injection and the ignition for the engine is controlled by the engine control unit.

At steps S1 and S2, the start control unit 10 checks if there is an engine start command. In this example, the start control unit 10 reads the brake signal at the step S1, and affirms the existence of an engine start command, at the step S2, when the brake sensor signal turns off (by release of the brake pedal).

When the brake pedal is released and hence the brake sensor signal turns off, the start control unit 10 proceeds to steps S3~S5 for setting a target revolution speed Ni for the engine 1, drives the motor/generator 2 so as to achieve the target revolution speed Ni and starts a counting operation of a timer. In this example, the target revolution speed Ni is set equal to an idle speed of the engine 1 (700 rpm, for example).

In this case, the driving torque of the motor/generator 2 is controlled so as to make the input torque of the torque converter 4 of the automatic CVT transmission 3 equal to a torque corresponding to the force of creep. When the engine revolution speed Ne increases to a predetermined speed, the engine control system-starts the fuel injection'to fire the engine, and decreases the driving torque of the motor/generator 2.

At steps S6 and S7, the start control unit 10 checks if the engine 1 has reaches a complete explosion state, by checking if the engine speed Ne determined from the sensor signal from the revolution sensor 9 has reached the target revolution speed Ni.

When the engine speed Ne becomes equal to or greater than Ni, the start control unit 10 stops the timer count at a step S8, calculates a power generation quantity (power generation torque) Tg of the motor/generator 2 in accordance with the count to of the timer at a step S9, and switches the control mode of the motor/generator 2 to the power generation mode, at a step S10, to achieve the calculated power generation torque Tg.

Thus, this control system controls the motor/generator 2 to generate power so as to absorb an excess of engine torque, and thereby restrains an increase of the engine speed Ne.

Figure 3:
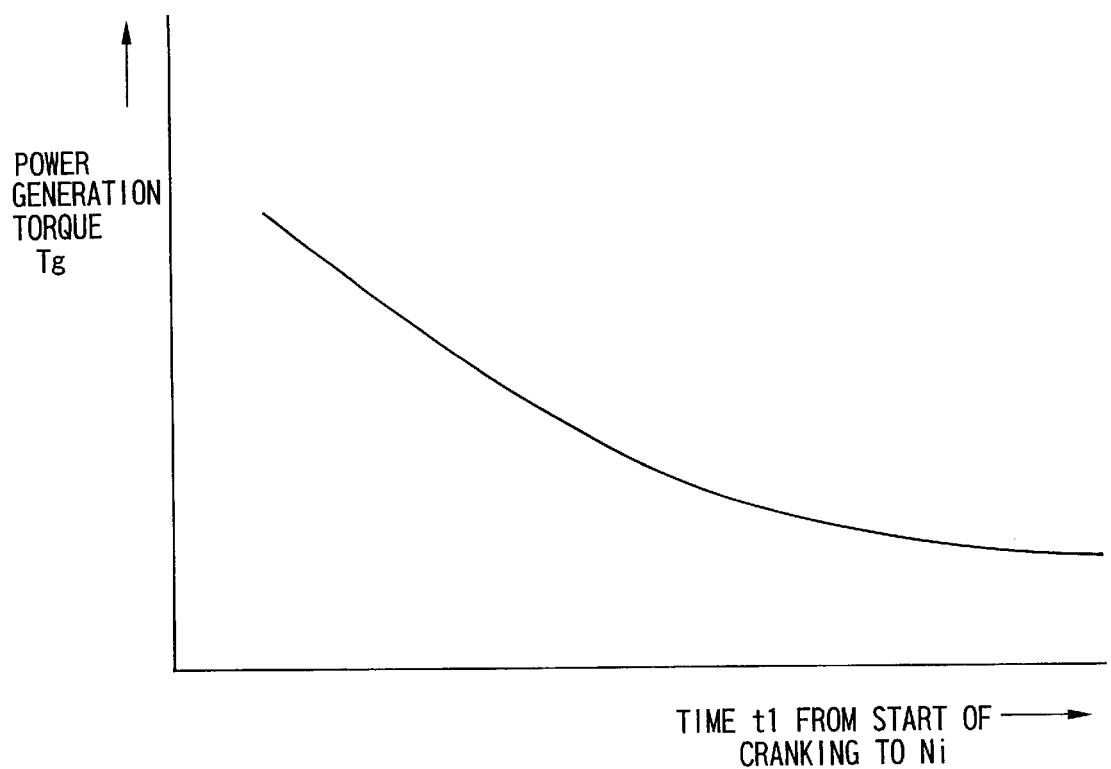
FIG. 3 is a graph showing a characteristic of a power generator torque used in the control process of FIG. 2.

The power generation torque Tg is determined from the time t1 from the start of the engine cranking operation to the time point at which the engine speed Ne becomes equal to or greater than Ni, by lookup from a map having a characteristic as shown in FIG. 3. In an initial stage of the engine cranking operation, the intake negative pressure (or intake vacuum) of the engine does not build up well, so that the intake air is sucked sufficiently. Accordingly, the generated engine torque becomes relatively large. With the elapse of time, the intake vacuum becomes stable, and the generated engine torque becomes constant or steady. Therefore, the power generation torque Tg is set equal to a large value to absorb a relatively large engine torque when the count time t1 is small. As the count time t1 increases, the power generation torque Tg decreases and converges to a predetermined constant value. The power generation quantity Tg in the example shown in FIG. 3 decreases monotonically as the quantity t1 representing the time from a start of the cranking operation to the arrival at the target engine speed Ni increases.

After the start of power generation by the motor/generator 2 at the step S10, the start control unit 10 checks, at steps S11 and S12, whether a difference (Ne−Ni) between the sensed engine speed Ne and the target engine speed Ni is equal to or lower than a predetermined difference value ΔNi.

When the difference (Ne−Ni) between the sensed engine speed Ne and the target engine speed Ni becomes equal to or lower than the predetermined difference value ΔNi, the start control unit 10 proceeds from the step S12 to steps S13 and S14 to control the revolution speed. In this speed control operation, the control system controls the drive and power generation of the motor/generator 2 in accordance with the difference between the sensed engine speed Ne and the target speed Ni so that the sensed engine speed Ne becomes equal to the target speed Ni. Thus, the control system performs this speed control operation to reduce the deviation of the sensed engine speed Ne from the target speed Ni to zero, by controlling the drive and power generation of the motor/generator 2.

Then, at steps S15~S19, the start control unit 10 monitors the difference between the sensed engine speed Ne and the target speed Ni, and a torque command representing a target torque Ts of the motor/generator 2, and terminates the control of the drive and power generation of the motor/generator 2 when the difference between the sensed engine speed Ne and the target speed Ni is equal to or smaller than the predetermined value ΔNi, and whether the target torque Ts of the motor/generator 2 is equal to or smaller than a predetermined value ΔTs.

Figure 4:
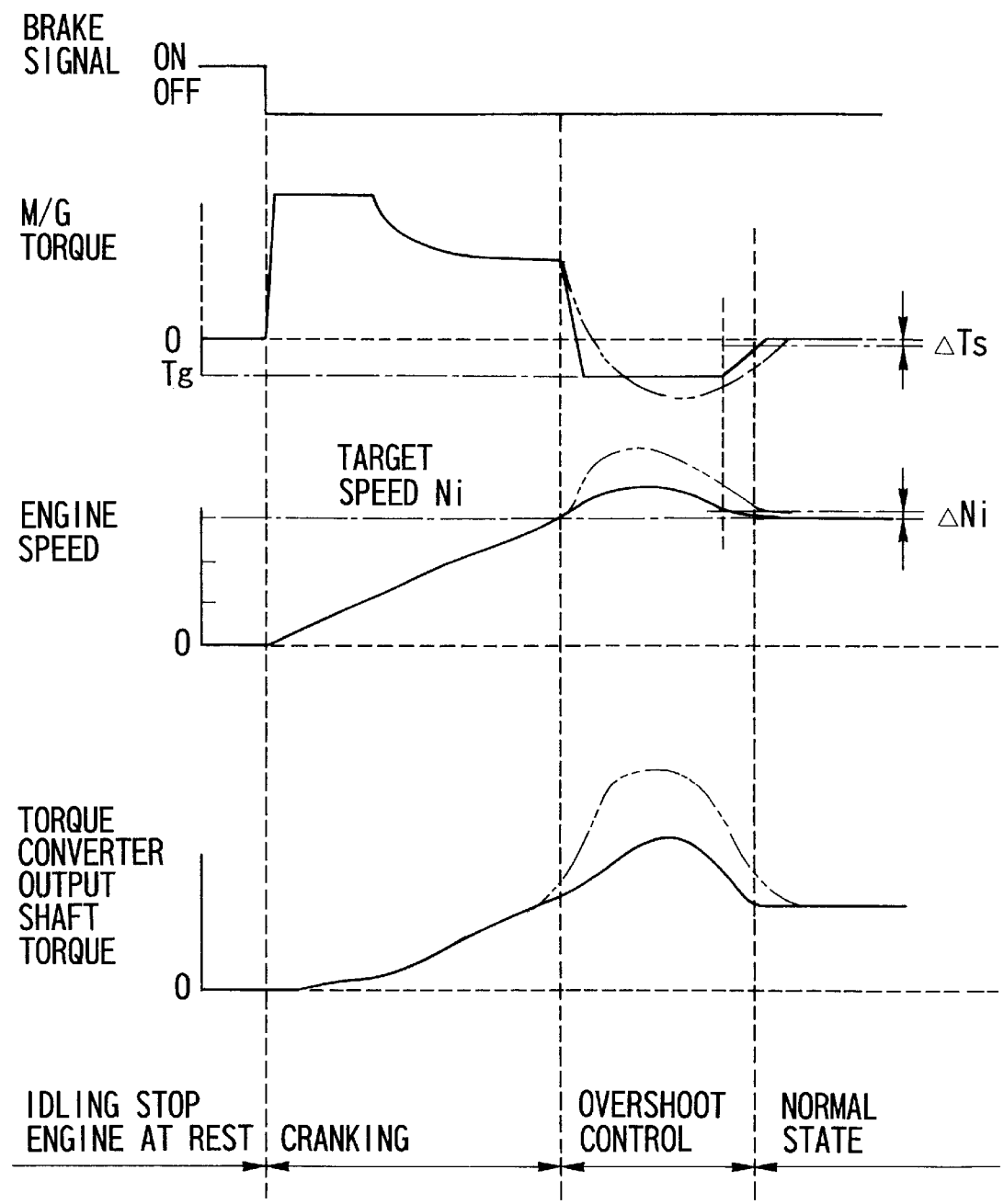
FIG. 4 is a timing chart for illustrating operations of the control system according to the first embodiment by solid lines in comparison with a starting system having no control shown by two dot chain lines.

The thus-constructed start control system can sufficiently reduce the amount of overshoot in the engine revolution speed during engine starting operation. This start control system commands the motor/generator 2 to start the engine 1 in response to an engine start command. The engine 1 is cranked by the motor/generator 2 to a complete explosion, and increases its revolution speed smoothly to the target speed Ni, as shown in a timing chart of FIG. 4. The engine speed smoothly settles down to the target speed Ni with no excessive increase.

When the engine speed Ne reaches the target idle speed Ni, the motor/generator 2 is switched to the power generation mode (before the occurrence of overshoot), and the power generation quantity Tg is set on the basis of the time t1 from the start of the engine cranking operation to the arrival at the target speed Ni. Therefore, this control system can restrain the overshoot of the engine revolution adequately by preventing the engine speed from exceeding the idle speed Ni excessively.

When, after the control of overshoot, the difference between the sensed engine speed Ne and the target idle speed Ni becomes equal to or smaller than the predetermined value ΔNi, the control system controls the motor/generator 2 in the drive mode or the power generation mode in accordance with the difference between the sensed engine speed Ne and the target speed Ni so as to reduce the difference to zero. Consequently, the engine speed smoothly approaches to the target speed, and the control system terminates the control of the drive and power generation of the motor/generator 2 quickly.

Thus, this control system can prevent a shock in engine starting, smoothly increase the driving force in vehicle starting, and improve the reliability of the automatic engine stop and restart system.

Figure 5:
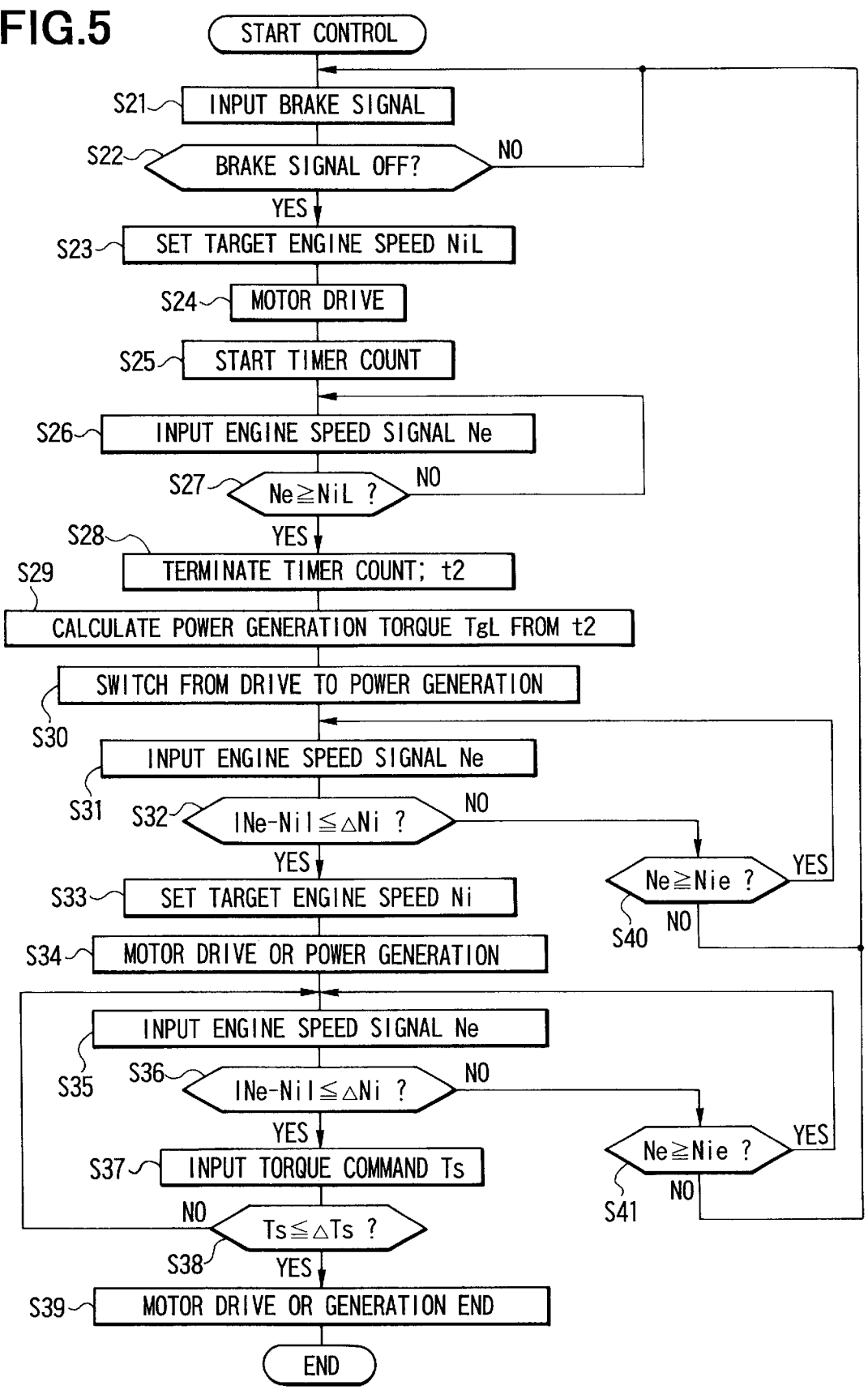
FIG. 5 is a flowchart showing a control process according to a second embodiment of the present invention.

FIG. 5 shows a control process according to a second embodiment of the present invention. In the second embodiment, the motor/generator 2 is switched to the power generation mode when the engine revolution speed Ne reaches a predetermined cranking speed.

At steps S21 and S22, the start control unit 10 checks if there is an engine start command, as in the steps S1 and S2 of FIG. 2.

When there is an engine start command, the start control unit 10 determines a target cranking speed NiL for the engine 1 at a step S23, drives the motor/generator 2 so as to achieve the target cranking speed NiL, and starts the timer counting. The target cranking speed NiL is set at a value smaller than the target idle speed Ni. For example, the target cranking speed is set about 500 rpm (a complete explosion speed) whereas the target idle speed Ni is 700 rpm.

When the engine speed reaches a predetermined engine speed, the control system starts the fuel injection, fires the engine 1, and decreases the driving torque of the motor/generator 2.

At steps S26 and S27, the start control unit 10 checks if the engine speed Ne becomes equal to or greater than the cranking speed NiL.

When the engine speed Ne reaches the cranking speed NiL, the start control unit 10 proceeds to steps S28~S30, at which the start control unit 10 terminates the timer counting, determines a power generation torque TgL in accordance with the count time T2 and switches the motor/generator 2 to the power generation mode to achieve the calculated power generation torque TgL.

Thus, when the engine speed Ne reaches the cranking speed NiL lower than or equal to the idle speed, the control system switches the operating mode of the motor/generator 2 from the drive mode to the power generation mode to absorb an excess of the engine torque.

The power generation torque TgL is determined from the time interval t2 from the start of the engine cranking to the arrival of the engine speed at the cranking speed NiL, by lookup from a map having a characteristic similar to the characteristic shown in FIG. 3. The power generation torque TgL decreases monotonically and smoothly with increase in the time interval t2 like the power generation torque Tg as shown in FIG. 3.

If the engine 1 is in a state of complete explosion, the engine speed increases continuously after the start of power generation by the motor/generator 2. The start control unit 10 checks if the difference between the engine speed Ne and the target idle speed Ni (700 rpm in this example) is equal to or smaller than the predetermined value ΔNi at steps 31 and S32.

When the absolute value of the difference between Ne and Ni becomes equal to or smaller than the predetermined value ΔNi, the start control unit 10 proceeds to steps S33 and S34, and performs the speed control by the drive and power generation of the motor/generator 2 in accordance with the difference between Ne and Ni.

If the absolute value of the difference between the engine speed Ne and the target idle speed Ni is greater than the predetermined value ΔNi, the start control unit 10 proceeds from the step S32 to a step S40, and checks at the step S40 if the engine speed Ne is equal to or higher than a predetermined engine stall judging speed Nie. If Ne is lower than Nie, the start control unit 10 judges that the engine 1 is not in the state of complete explosion, and returns to the step S21 to repeat the cranking operation of the steps S23 and the subsequent steps.

After the step S34, the start control unit 10 monitors the engine speed Ne and the target torque Ts of the torque command for the motor/generator Ts at steps S35~S39, and terminates the drive and power generation control of the motor/generator 2 when the difference between Ne and Ni becomes equal to or smaller than the predetermined value ΔNi and at the same time the target torque Ts of the torque command is equal to or smaller than the predetermined value ΔTs.

When the absolute value of the difference |Ne−Ni| between Ne and Ni becomes greater than ΔNi, the start control unit 10 proceeds from the step S36 to a step S41, and checks at the step S41 if the engine speed Ne is equal to or higher than the predetermined engine stall judging speed Nie. If Ne is lower than Nie, the start control unit 10 judges that the engine 1 is not in the state of complete explosion, and returns to the step S21 to repeat the cranking operation of the steps S23 and the subsequent steps.

Figure 6:
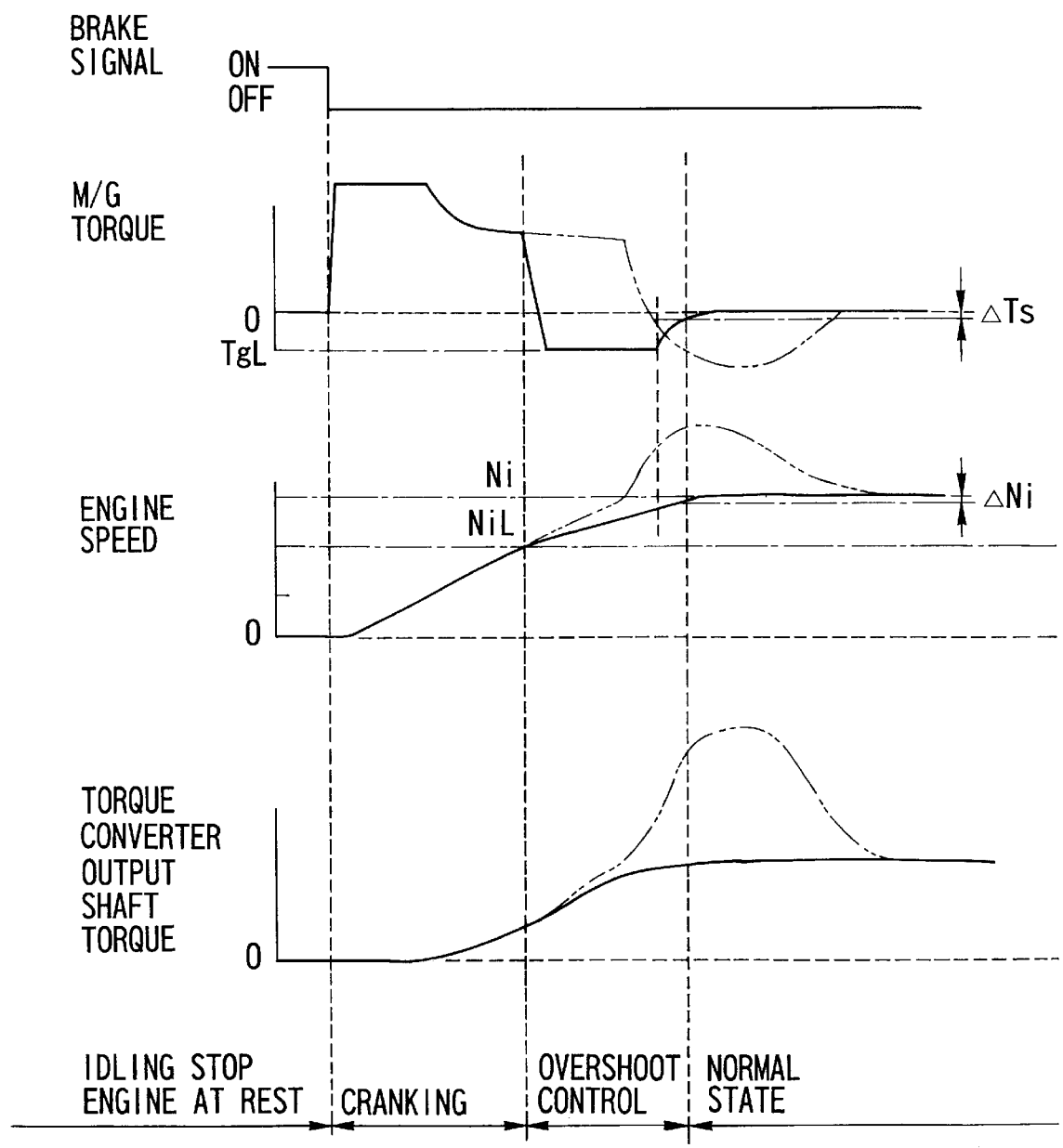
FIG. 6 is a timing chart for illustrating operations of the cool system according to the second embodiment.

The start control system according to the second embodiment can prevent the engine speed from exceeding the target idle speed Ni and thereby sufficiently reduce the amount of overshoot in the engine revolution speed during engine starting operation, as shown in FIG. 6. When the engine speed Ne reaches the cranking speed NiL, the control system switches the motor/generator 2 to the power generation mode, and causes the motor/generator 2 to absorb an abrupt torque increase due to complete explosion in the engine 1. The engine speed Ne increases smoothly up to the target idle speed Ni.

Thus, this control system can prevent a shock in engine starting, and increase the driving force in vehicle starting.

Moreover, when the explosion is incomplete, this control system can prevent an engine stall due to changeover of the motor/generator 2 to the power generation mode.

Figure 7:
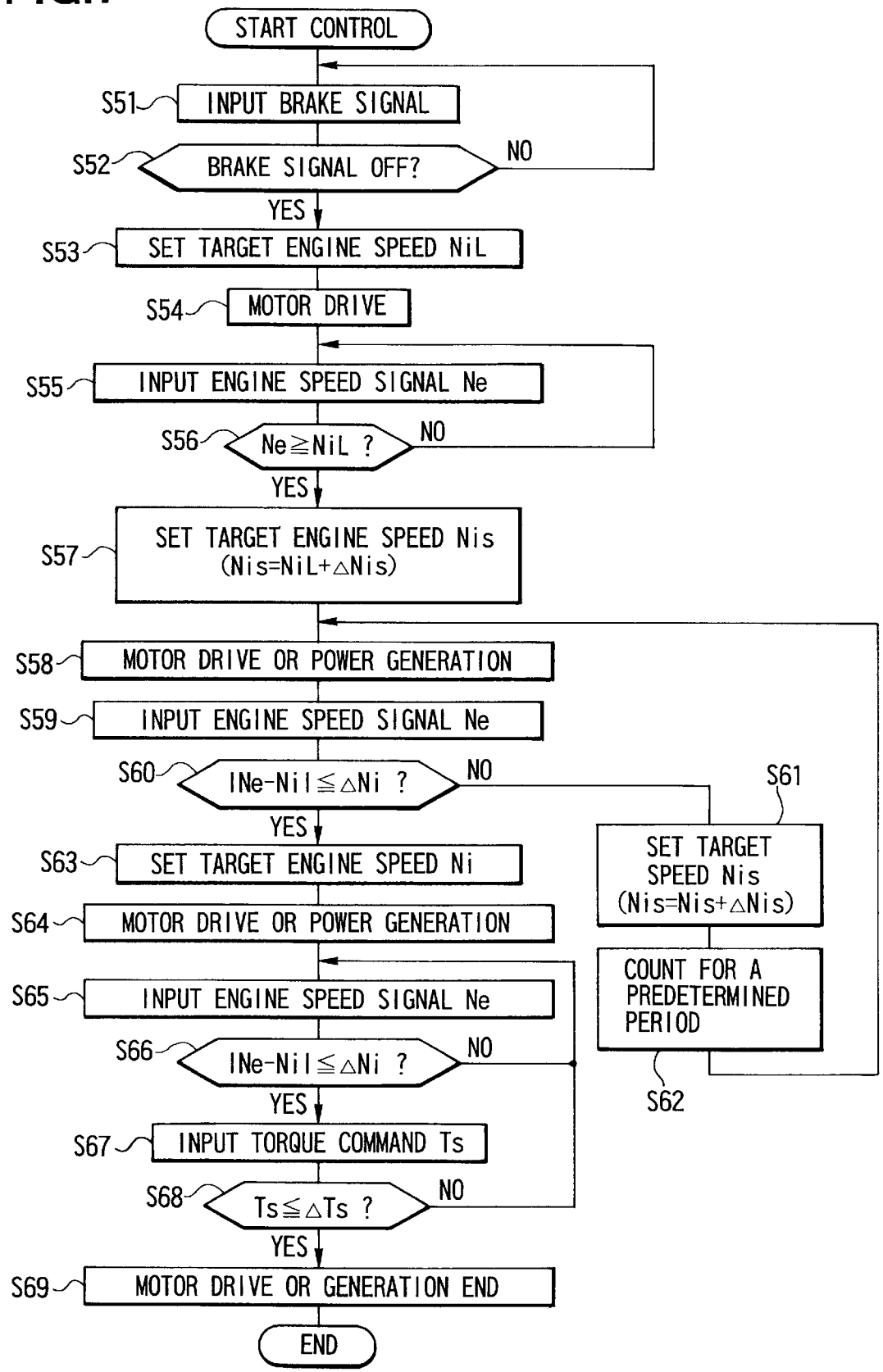
FIG. 7 is a flowchart showing a control process according to a third embodiment.

FIG. 7 shows a control process according to a third embodiment of the present invention. When the engine revolution speed Ne reaches the predetermined cranking speed, the control system according to the third embodiment switches the operating mode of the motor/generator 2 between the drive mode and the power generation mode while monitoring the engine speed, and thereby increases the engine speed to the target idle speed.

At steps S51 and S52 shown in FIG. 7, the start control unit 10 checks if there is an engine start command, as in the steps S1 and S2 of FIG. 2.

When there is an engine start command, the start control unit 10 determines a target cranking speed NiL (500 rpm in this example) for the engine 1 at a step S53, and drives the motor/generator 2 so as to achieve the target cranking speed NiL at a step S54.

When the engine speed reaches a predetermined engine speed, the control system starts the fuel injection, fires the engine 1, and decreases the driving torque of the motor/generator 2.

At steps S55 and S56, the start control unit 10 checks if the engine speed Ne becomes equal to or greater than the cranking speed NiL.

When the engine speed Ne reaches the cranking speed NiL, the start control unit 10 proceeds to steps S57~S62, and controls the motor/generator 2 in the drive mode and the power generation mode so as to increase the engine speed gradually. The start control unit 10 sets a (transient) target engine speed Nis at the step S57, and controls the drive and power generation of the motor/generator 2 in accordance with the engine speed Ne and the target speed Nis so that the sensed speed follows up the target speed Nis. The target speed Nis is gradually increased by adding a predetermined amount ΔNis to the cranking speed NiL once in each cycle of a predetermined period.

When the absolute value of the difference between Ne and Ni is greater than ΔNi, the start control unit 10 proceeds from the step S60 to the steps S61 and S62. At the step S61, the target speed Nis is increased by the predetermined amount ΔNis. Then, the predetermined period is measured by counting at the step S62. After the step S62, the start control unit 10 returns to the step S58.

Thus, this control system controls the motor/generator 2 in the power generation mode to restrain a sharp increase in the engine speed Ne when the combustion in the engine is in a good state, and switches the motor/generator 2 from the power generation mode to the drive mode in response to a decrease of the engine speed below the target speed Nis to meet the incomplete explosion and undesired variation in the revolution speed. In this case, the control system determines the power generation torque and the drive torque of the motor/generator 2 in accordance with the engine speed Ne and the target speed Nis.

When the absolute value of the difference between the engine speed Ne and the target idle speed Ni is equal to or smaller than the predetermined value ΔNi, the start control unit 10 proceeds from the step S60 to steps S63 and S64, and performs the speed control operation to perform the drive operation and the power generation operation of the motor/generator 2 in accordance with the deviation of the sensed engine speed Ne from the target idle speed Ni.

Thereafter, the start control unit 10 monitors the engine speed Ne and the target torque Ts of the torque command for the motor/generator at steps S65~S68, and terminates the drive and power generation control of the motor/generator 2, at a step S69, when the difference between Ne and Ni becomes equal to or smaller than the predetermined value ΔNi and at the same time the target torque Ts is equal to or smaller than the predetermined value ΔTs.

Figure 8:
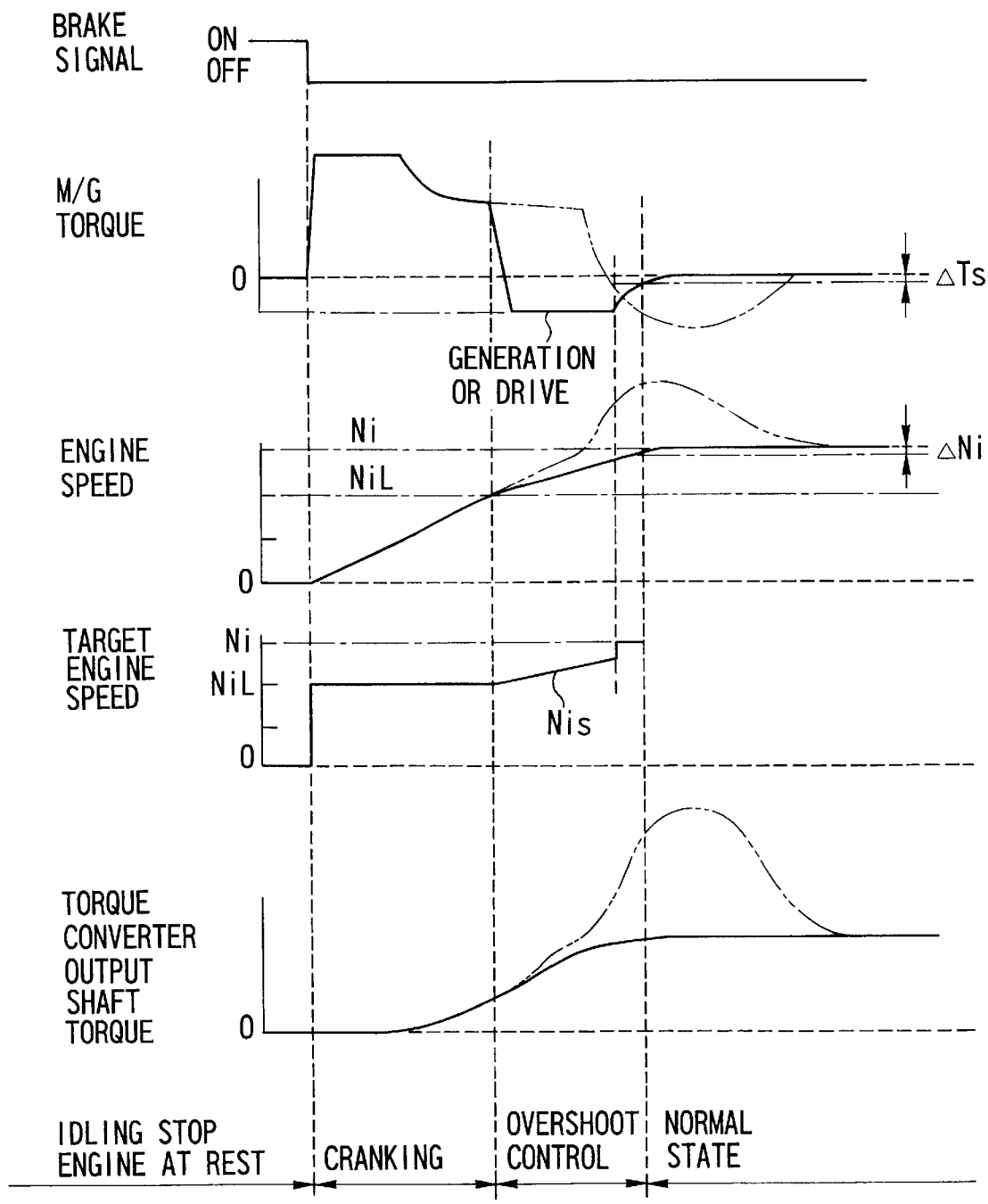
FIG. 8 is a timing chart for illustrating operations of the control system according to the third embodiment.

The start control system according to the third embodiment controls the engine speed so that the engine speed increases up to the target idle speed Ni by following is up the gradually increasing target speed Nis, as shown in FIG. 8. This control system can prevent the engine speed from exceeding the target idle speed Ni, and prevent an overshoot.

Thus, this control system can prevent a shock in engine starting, and smoothly increase the driving force in vehicle starting. Moreover, when the explosion is incomplete, this control system can prevent an engine stall due to changeover of the motor/generator 2 to the power generation mode.

Figure 9:
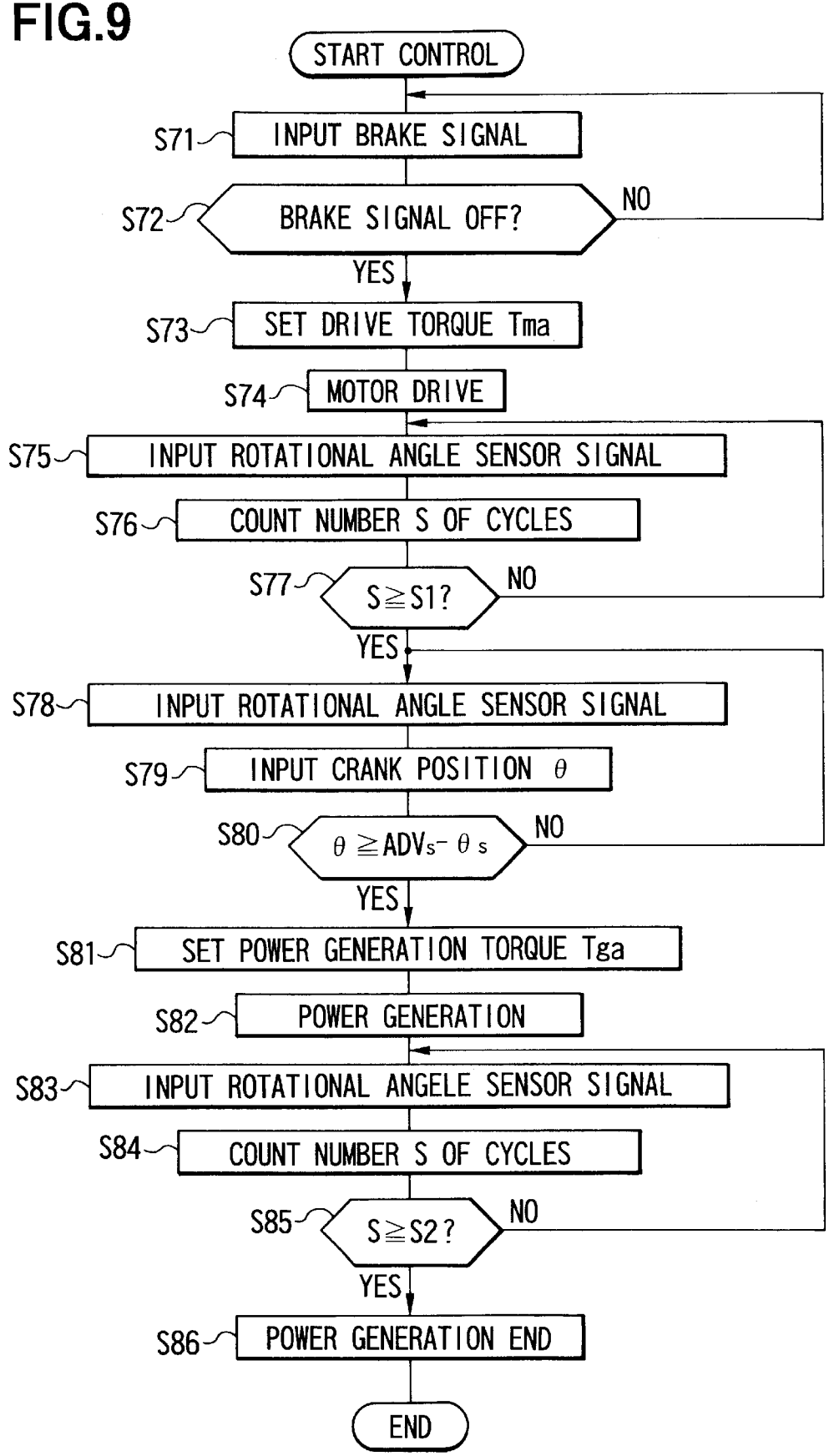
FIG. 9 is a flowchart showing a control process according to a fourth embodiment.

FIG. 9 shows a control process according to a fourth embodiment of the present invention. The control system according to the fourth embodiment is configured to control the drive, the power generation and the control termination of the motor/generator 2 in accordance with the number of engine cycles.

At steps S71 and S72, the start control unit 10 checks if there is an engine start command as in the steps S1 and S2 of FIG. 2.

When there is an engine start command, the start control unit 10 sets a drive torque Tma of the motor/generator 2 at a step S73, and drives the motor/generator 2 at a step S74. In this example, the drive torque Tma is set equal to a predetermined constant value within operating limits of the motor/generator 2. The engine control system starts the fuel injection simultaneously with the drive of the motor/generator 2.

Then, the start control unit 10 reads the sensor signal from the engine revolution sensor 9 at a step S75, counts the number S of engine cycles at a step S76, and checks, at a step S77, if the number S of engine cycles becomes equal to or greater than a predetermined number S1. The number S of engine cycles is determined by counting cylinder discrimination signals produced in accordance with the crank angle. The predetermined number S1 is set to such a value that each cylinder completes one cycle. For example, the predetermined number S1 may be 6 or 7 in the case of an engine having six cylinders.

When the number S becomes equal to or greater than St, the start control unit 10 proceeds to steps S78~S80, in which the control unit 10 reads the crank position θ and checks if the crank position θ reaches a predetermined position advanced by a predetermined crank angle θs from the ignition timing ADVs of the next cylinder. The ignition is started from the next cylinder at the ignition timing ADVs. Thus, the start control unit 10 checks, at the step S80, if θ is equal to or greater than (ADVs−θs).

When θ becomes equal to or greater than (ADVs−θs), the start control unit 10 sets a power generation torque Tga at a step S81, and switches the operating mode of the motor/generator 2 from the drive mode to the power generation mode at a step S82.

Thus, the control system switches the operation mode of the motor/generator 2 to the power generation mode just before the ignition timing of the cylinder to undergo the first firing after about one round from the fuel injection. The crank angle θs is a predetermined value corresponding to a delay in changeover of the motor/generator 2 to the power generation mode, and power generation of the motor/generator 2. The power generation torque Tga is determined in accordance with the time from the start of the engine cranking operation by lookup from having a characteristic similar to the characteristic of the power generation torque Tg (as shown in FIG. 3). Alternatively, the power generation torque Tga is fixed at a predetermined constant value.

Then, at steps S83~S86, the start control unit 10 checks if the number S of engine cycles becomes equal to or greater than a predetermined number S2 which is greater than S1, and terminates the power generation of the motor/generator when S2≧S2.

The number S2 is set equal to a number of engine cycles by which each cylinder reaches the state of complete explosion and the engine speed increases to a value close to the idle speed. For example, S2 is equal to 15 or 16 in the case of an engine having six cylinders.

As in the second embodiment, it is optional to compare the engine speed with an engine stall judging speed Nie, and repeats the step S73 and the subsequent steps if the engine speed Ne becomes lower than Nie.

Figure 10:
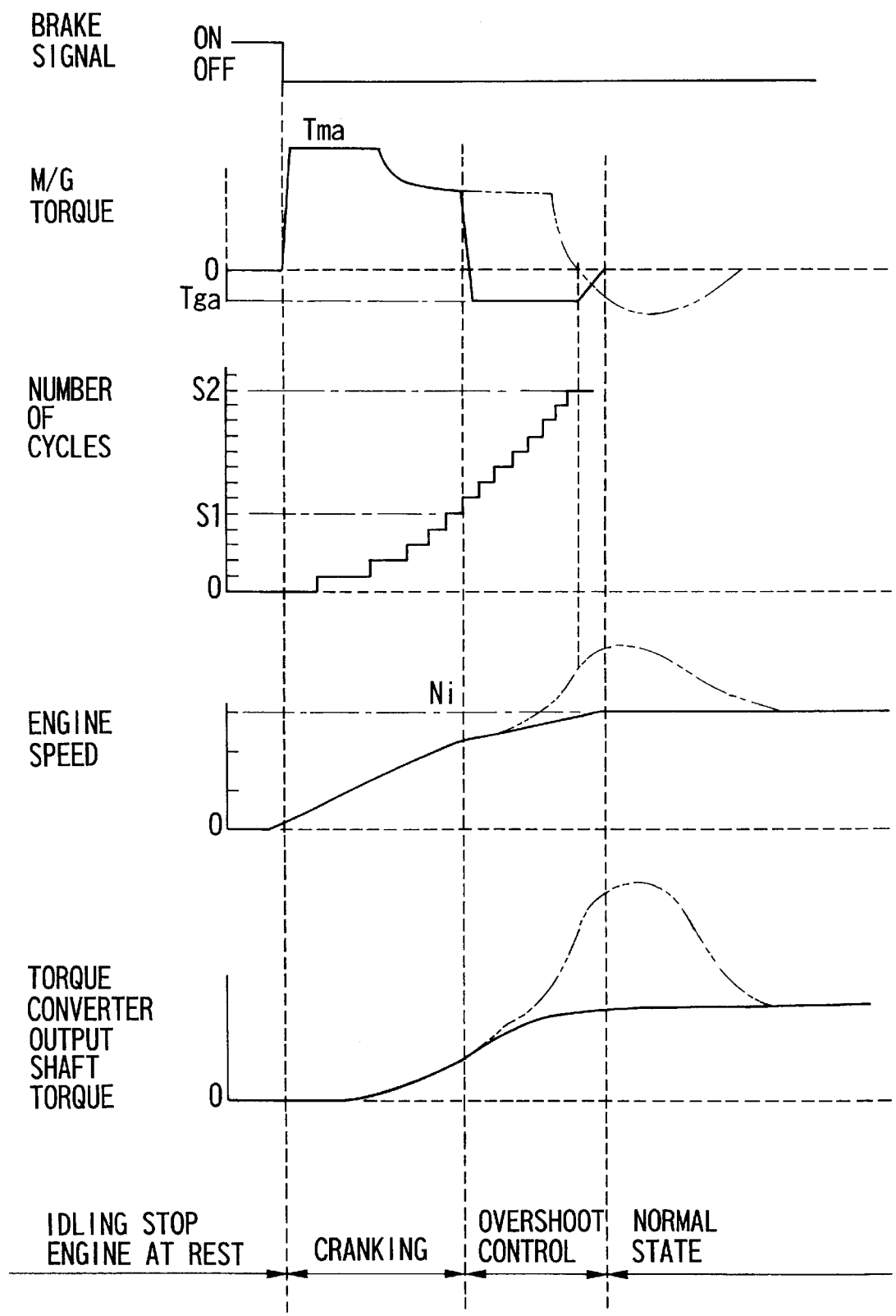
FIG. 10 is a timing chart for illustrating operations of the control system according to the fourth embodiment.

Thus, this control system controls the drive, power generation and termination of the motor/generator 2 in accordance with the number S of engine cycles, and thereby prevents an overshoot in the engine speed sufficiently as shown in FIG. 10.

The control system counts the number of cycles and switches the motor/generator 2 to the power generation mode in time with the ignition of the first cylinder to fire. Therefore, the motor/generator 2 can start absorbing torque adequately simultaneously with the complete explosion. Accordingly, the engine speed Ne is increased quickly to the idle speed Ni without requiring a long duration of power generation.

The control system of this embodiment can prevent a shock in engine starting, and increase the driving force in vehicle starting smoothly and quickly, and facilitate the control.

In this example, the motor/generator 2 is switched to the power generation mode just (a predetermined crank angle θs) before the ignition of the first cylinder to fire. However, it is optional to switch the operating mode of the motor/generator 2 to the power generation mode substantially simultaneously with the ignition timing ADVs.

Instead of counting the number of engine cycles, the control system may be arranged to count the time elapsed from a start of engine cranking, and to control the drive, power generation and termination of the motor/generation 2 in accordance with the elapsed time. The time counting in place of the cycle counting further simplifies the control.

The control system in each of the preceding embodiments is configured to produce an engine start command signal when the brake sensor signal turns off. This configuration is adequate when the invention is applied to the automatic engine stop and restart system. In the case of a normal engine start control system, it is optional to regard an operation of an ignition switch of a vehicle as an engine start command signal.

This application is based on a Japanese Patent Application No. 11-9366. The entire contents of this Japanese Patent Application with a filing date of Jan. 18, 1999 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine control system comprising:
   an engine for a vehicle;
   a motor/generator having a drive mode for driving the engine to start the engine and a power generation mode for converting mechanical energy from the engine into electric energy;
   a first input device for producing a vehicle start command signal;
   a second input device for determining an engine revolution speed of the engine; and
   a controller for starting an engine cranking operation to start the engine by operating the motor/generator in the drive mode in response to the start command signal, for measuring a time from a start of the engine cranking operation until the engine speed reaches a predetermined engine speed value, for calculating an electric power generation quantity in accordance with the time, and for controlling the power generation of the motor/generator in accordance with the power generation quantity after the arrival of the engine speed at the predetermined engine speed value.

2. The engine control system according to claim 1 wherein the predetermined engine speed value is set equal to an idle speed.

3. The engine control system according to claim 1 wherein the predetermined engine speed value is set equal to a cranking speed lower than an idle speed.

4. The engine control system according to claim 3 wherein the controller is configured to monitor the engine speed during the power generation control operation to determine whether the engine speed becomes equal to or lower than a predetermined engine stall judgment speed which is lower than the cranking speed, and to restart the engine cranking operation if the engine speed becomes equal to or lower than the predetermined engine stall judgment speed.

5. The engine control system according to claim 1 wherein the controller is configured to terminate the engine cranking operation and instead to start a power generation control operation based on the power generation quantity when the engine speed becomes equal to or higher than the predetermined engine speed value.

6. The engine control system according to claim 5 wherein the controller is configured to terminate the power generation control operation and instead to start a speed control operation to control the motor/generator so as to reduce a speed deviation of the engine speed from a target speed when the deviation becomes equal to or smaller than a predetermined value.

7. The engine control system according to claim 6 wherein the predetermined engine speed value is equal to the target speed.

8. The engine control system according to claim 5 wherein the controller is configured to monitor a speed difference between the engine speed and a desired target speed after an engine starting operation and a target torque represented by a torque command signal to control the torque of the motor/generator, and terminate the engine starting operation of the motor/generator when the speed difference is equal to or smaller than a predetermined value and at the same time the target torque is equal to or smaller than a predetermined value.

9. An engine control system comprising:

an engine for a vehicle;

a motor/generator having a drive mode for driving the engine to start the engine and a power generation mode for converting mechanical energy from the engine into electric energy;

a first input device for producing a vehicle start command signal;

a second input device for determining an engine revolution speed of the engine by sensing revolution of at least one of the engine and the motor/generator; and a controller for starting an engine cranking operation to start the engine by operating the motor/generator in the drive mode in response to the start command signal, for producing a speed condition signal when the engine speed reaches a predetermined engine speed value, and for responding to the speed condition signal by terminating the engine cranking operation and instead starting a gradual speed increasing operation to control the motor/generator so as to increase the engine speed gradually to a desired target speed.

10. The engine control system according to claim 9 wherein, in the gradual speed increasing operation, the controller is configured to increase a transient target speed gradually to the desired target speed which is a desired after-start target speed after an engine starting operation, and to control the motor/generator in one of the drive mode and the power generation mode in accordance with a deviation of the engine speed from the transient target speed.

11. The engine control system according to claim 9 wherein the controller is configured to monitor a speed difference between the engine speed and an desired afterstart speed after an engine starting operation and a target torque represented by a torque command signal to control the torque of the motor/generator, and to determine a timing of terminating the engine starting operation of the motor/generator in accordance with the speed difference and the target torque.

12. An engine control system comprising:

an engine for a vehicle;

a motor/generator having a drive mode for driving the engine to start the engine and a power generation mode for converting mechanical energy from the engine into electric energy;

a first input device for producing a vehicle start command signal; and a controller for starting an engine cranking operation to start the engine by operating the motor/generator in the drive mode in response to the start command signal, for producing a condition signal when a duration of the engine cranking operation reaches a predetermined length, and for responding to the condition signal by terminating the engine cranking operation and instead starting a power generating operation to control the motor/generator in the power generation mode in accordance with a predetermined power generation quantity.

13. The engine control system according to claim 12 wherein the controller is configured to determine a timing of starting the power generating operation in relation to an ignition timing after the condition signal.

14. The engine control system according to claim 13 wherein the timing of starting the power generation operation is advanced by a predetermined amount before the ignition timing.

15. The engine control system according to claim 12 wherein the engine control system further comprises a second input device sensing the revolution of the engine to count the number of engine cycles, and the controller is configured to measure the duration of the engine cranking operation by counting the number of engine cycles from a start of the engine cranking operation.

16. The engine control system according to claim 12 wherein the controller is configured to measure the duration of the engine cranking operation by measuring a time elapsed from a start of the engine cranking operation.

17. An engine control apparatus for controlling a motor/generator to start an engine for a vehicle, comprising:

means for responding to an engine start command signal by starting an engine cranking operation to start the engine by operating the motor/generator in a cranking mode for driving the engine;

means for monitoring an operating condition of the engine cranking operation to produce a mode change signal before an engine speed exceeds a target speed; and means for responding to the mode change signal by changing over an operating mode of the motor/generator from the cranking mode to an overshoot control mode to control the motor/generator to generate electric power in such a manner that an operating parameter of the motor/generator becomes equal to a predetermined desired value.

18. An engine start control process comprising:

producing an engine start command signal;

starting an engine cranking operation to start the engine by operating an motor/generator in a cranking mode for driving an engine in response to the engine start command signal;

monitoring an operating condition of the engine cranking operation to produce a mode change signal before an engine speed exceeds a target speed; and responding to the mode change signal by changing over an operating mode of the motor/generator from the cranking mode to an overshoot control mode to control power generation of the motor/generator in accordance with a predetermined target parameter which is one of a desired power generation torque and a desired engine speed.

* * * * *